IMAGE MATCHING APPARATUS

Filed Nov. 13, 1956

8 Sheets-Sheet 1

INVENTOR
ROBERT DRESSLER

BY

Pennie Edmonds Morton Barrows & Taylor

ATTORNEYS

INVENTOR
ROBERT DRESSLER
BY
Pennie Edmonds, Morton Barrows & Taylor
ATTORNEYS

June 27, 1961 R. DRESSLER 2,989,890

IMAGE MATCHING APPARATUS

Filed Nov. 13, 1956 8 Sheets-Sheet 3

INVENTOR
ROBERT DRESSLER

BY
Pennie, Edmonds, Morton, Barrows & Taylor
ATTORNEYS

INVENTOR
ROBERT DRESSLER
BY
Pennie Edmonds Morton Barrows & Taylor
ATTORNEYS

INVENTOR
ROBERT DRESSLER
BY
Pennie Edmonds Morton Barrows & Taylor
ATTORNEYS

June 27, 1961 R. DRESSLER 2,989,890

IMAGE MATCHING APPARATUS

Filed Nov. 13, 1956 8 Sheets-Sheet 6

INVENTOR
ROBERT DRESSLER
BY
Pennie Edmonds Morton Barrows Taylor
ATTORNEYS

INVENTOR
ROBERT DRESSLER
BY
Pennie, Edmonds, Morton, Barrows & Taylor
ATTORNEYS

June 27, 1961 R. DRESSLER 2,989,890

IMAGE MATCHING APPARATUS

Filed Nov. 13, 1956 8 Sheets-Sheet 8

INVENTOR
ROBERT DRESSLER
BY
Pennie Edmonds Morton Barrows & Taylor
ATTORNEYS 2,989,890
Patented June 27, 1961

2,989,890

IMAGE MATCHING APPARATUS

Robert Dressler, Elmont, N.Y., assignor, by mesne assignments, to Paramount Pictures Corporation, New York, N.Y., a corporation of New York Filed Nov. 13, 1956, Ser. No. 621,844
5 Claims. (Cl. 88—14)

This invention relates to cartography, and more particularly to apparatus by means of which strip or area maps may be made up from a plurality of partly overlapping photographs of the area intended to be mapped. The invention is useful not only in the production of actual maps but in the determination of position coordinates for landmarks shown on such photographs. Moreover the invention is thus applicable not only to mapping with actual photographs of portions of the earth's surface or other area to be mapped, produced by light rays directly on photosensitive film, but also to mapping by means of a plurality of partially overlapping representations of the area to be mapped which are otherwise obtained. In particular, the invention is applicable to the production of maps, charts and position coordinate tables from radar images, by means of photographs taken of radar displays of the type which produce a two-dimensional or pictorial representation of the target area scanned by the radar. The so-called P.P.I. or plan position indicator radar displays are an example of this type of display. With this type of display there appears on the fluorescent screen of the radar receiver, for example when flown in an aircraft, a pictorial representation of a circular area of the earth's surface. Corrections can be introduced electrically into the radar equipment to compensate for such peculiarities of radar mapping as slant range, shear distortion, and the like.

In accordance with the invention two film transparencies are provided, representative of two radar images having a substantial amount of overlapping, i.e. of common content. These are then supported for controlled relative motion and are scanned, over the common or overlapping portions, with identical flying spot rasters. The light transmissions of the two transparencies are then photoelectrically compared and one transparency is moved, by rotation and translation, to minimize the difference between electrical signals representative of these transmissions. The relative linear and angular positions of the two transparencies for minimum signal difference then constitute a set of data by which the two transparencies are related in building up a map or chart.

This matching procedure may be carried out not only for a series of successive photographs taken, for example, during the course of a mapping flight, but also with respect to partly overlapping exposures from adjacent, parallel flights, so that a map or chart can be built up of an area having any desired width as well as length.

If an actual chart is desired it may be produced by photographically printing, at any enlarged scale, the successive transparencies, the film holder being shifted with respect to the paper or film on which the print is made between successive transparencies or "frames," commonly appearing on a roll of film, in accordance with the data obtained by matching adjacent transparencies.

The invention will now be further described by reference to the accompanying drawings in which.

Figure 5:
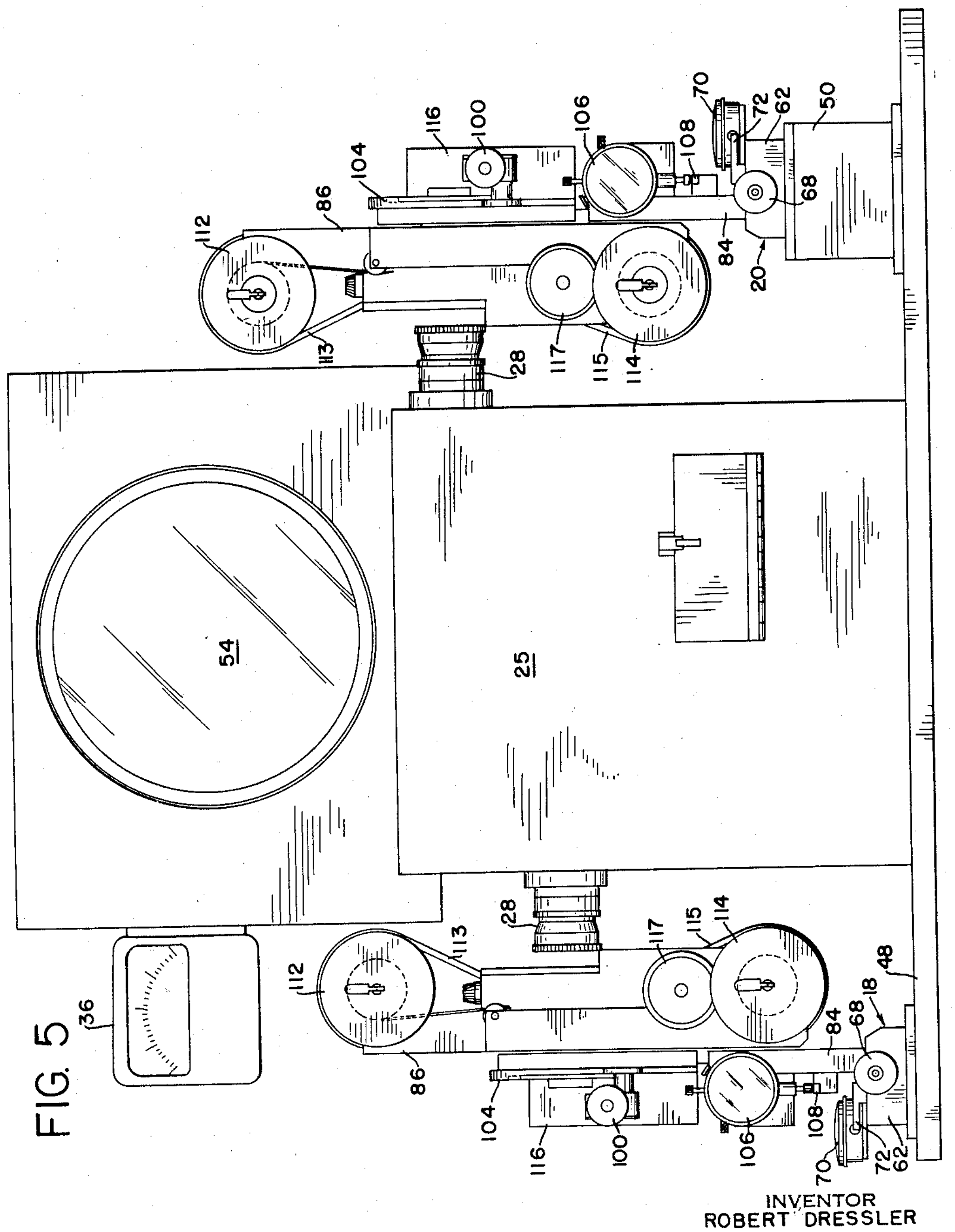
FIG. 5 is a view in front elevation of a radar photograph matching machine of the type schematically indicated in FIG. 3.
Figure 8:
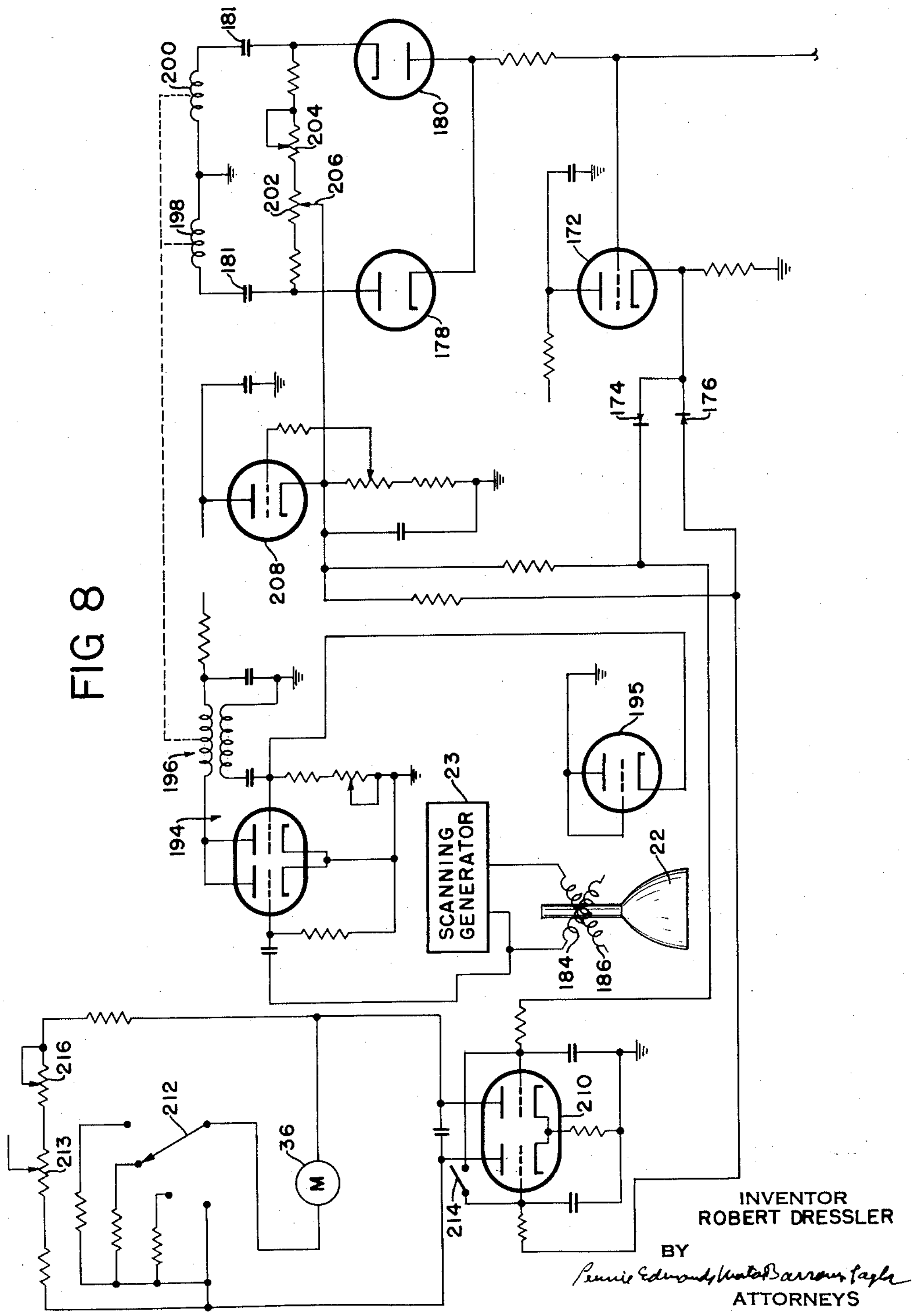
Figure 8A:
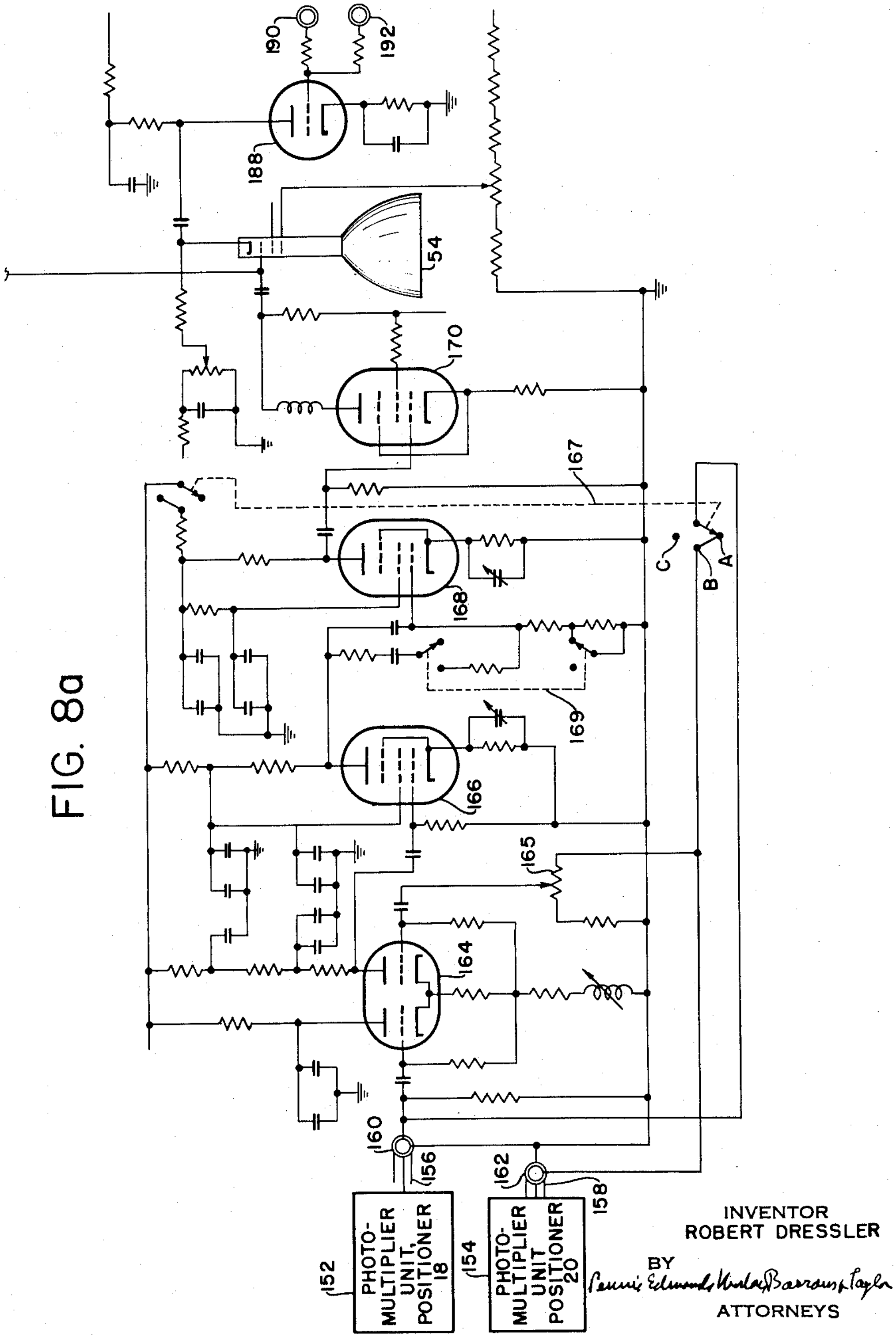
Figure 9:
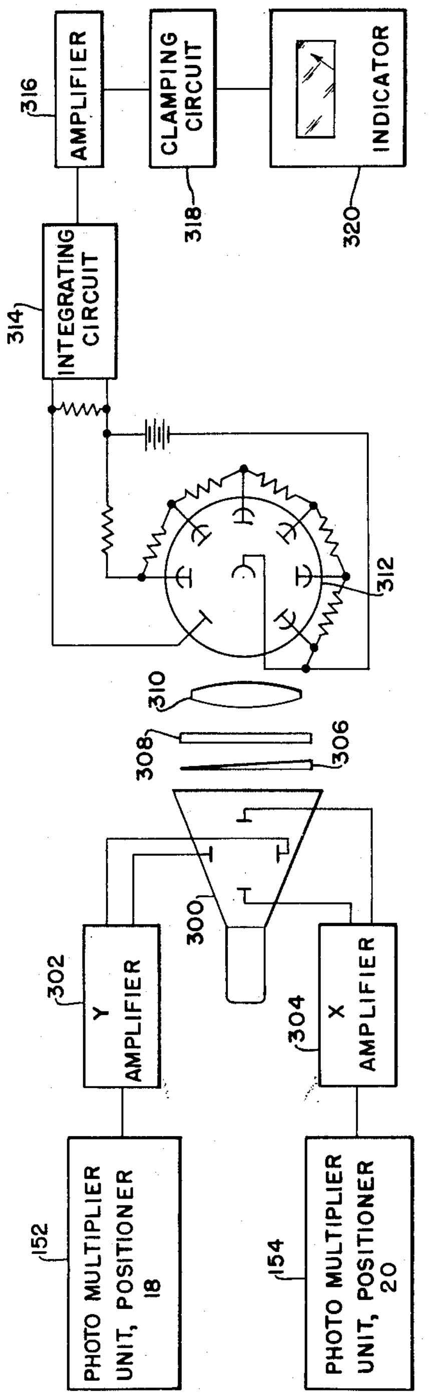

FIGS. 8 and 8*a* together form a schematic diagram of the electrical components of the machine of FIG. 5; and FIG. 9 is a diagram partly in block form of an arrangement of apparatus alternative to a portion of the apparatus of FIGS. 8 and 8a.

Figure 1:
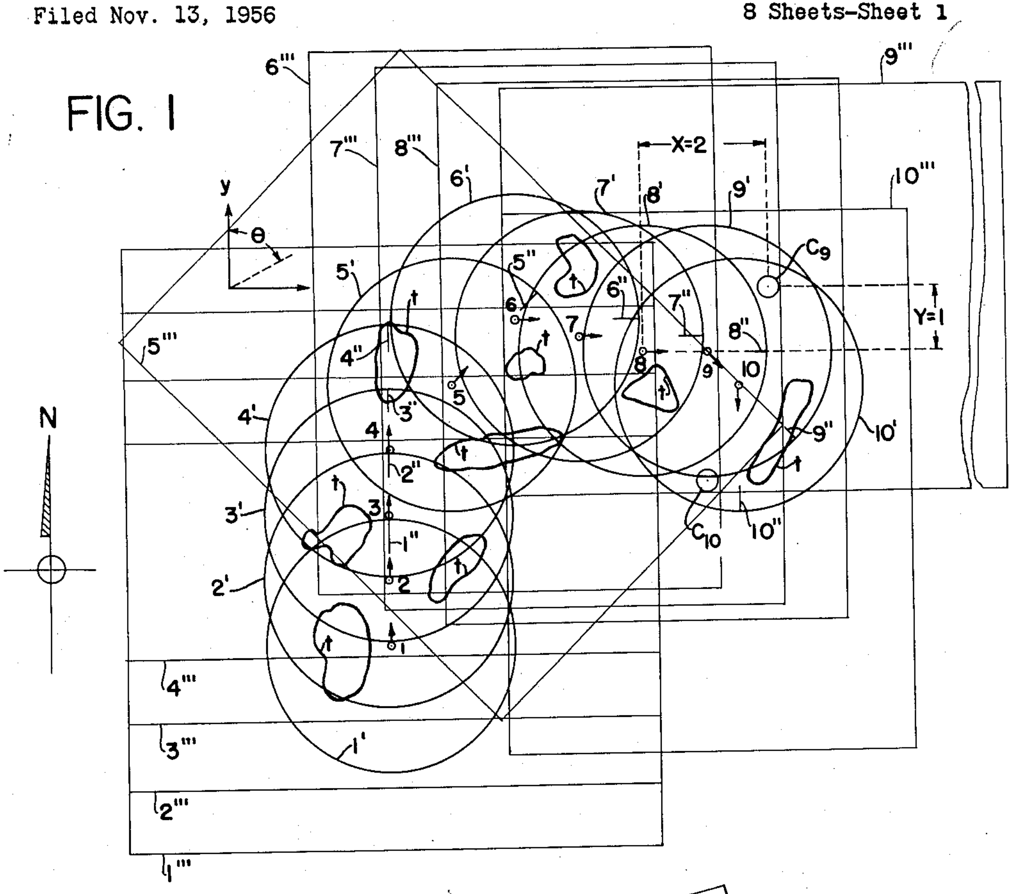
FIG. 1 is a diagram indicating topographical features of an area of the earth to be mapped, as they would appear on a radar receiver, and having indicated thereon the successive overlapping areas contained in individual photographic exposures.

In FIG. 1 irregularly shaped topographical features of an area of the earth as they appear on the cathode-ray tube screen of a radar receiver having P.P.I. display are indicated in outline at the closed lines *t*. FIG. 1 is hence a topographical map of minimum detail, to which certain additional indicia have been applied. The points numbered successively 1–10 represent the centers of a succession of circular areas on the earth numbered 1′–10′, an image of each of which is displayed on the P.P.I. display cathode-ray tube of the radar receiver in an aircraft when located above the earth, at suitable altitude, at the corresponding one of the points 1–10. Consequently each of the circular areas 1′–10′ is a representation of the P.P.I. radar screen, in photographic form. On each a short radial line numbered 1″–10″ to correspond to the number of the radar image identifies the lubber line by means of which the aircraft heading is indicated on the radar screen. Each of these circular photographic images is printed on a rectangular piece of film or "frame," successive frames being indicated at the rectangular lines 1‴–10‴. The short arrow leading from each of the points 1–10 represents the heading of the mapping aircraft when at the position of that point. These arrows are consequently parallel to the lubber line of the corresponding radar image. The images or exposures numbered 1″ to 8″ are shown printed, as is desirable, all in the same relative position on their respective frames 1‴ to 8‴, i.e. centered thereon, and with the aircraft heading as indicated on the photograph by the lubber line always oriented in the same way with respect to the frame, i.e. parallel to the short sides thereof. Exposures 9′ and 10′ have been printed on their frames with translational and angular departures from this relation.

It will be seen that each pair of adjacent exposures such as 1′ and 2′ or 9′ and 10′ includes a substantial percentage of topographical area in common, this overlap amounting advantageously to some 60 percent of the circular area embraced by each exposure. The invention relates to apparatus whereby one or more series of thus overlapping exposures, taken for example in the course of the flight of an aircraft, can be correlated in order to reconstruct therefrom a map or chart of the area. The invention is not restricted to the production of actual maps and charts and instead often has for its end product the collection and organization of positional data, for example in terms of latitude and longitude, of landmarks recorded in such a succession of exposures.

The invention moreover contemplates the collection of a plurality of such successions of overlapping exposures such as might for example be made in the course of a series of flights by a mapping aircraft moving in a northerly direction and departing from an east-west base line, the northerly flights being spaced east and west by a distance small enough so as to provide a degree of overlap between the exposures of two such adjacent flight strips of approximately the same amount as the overlap between successive radar photographs taken on a single film roll by an aircraft during a single mapping flight.

Figure 2:
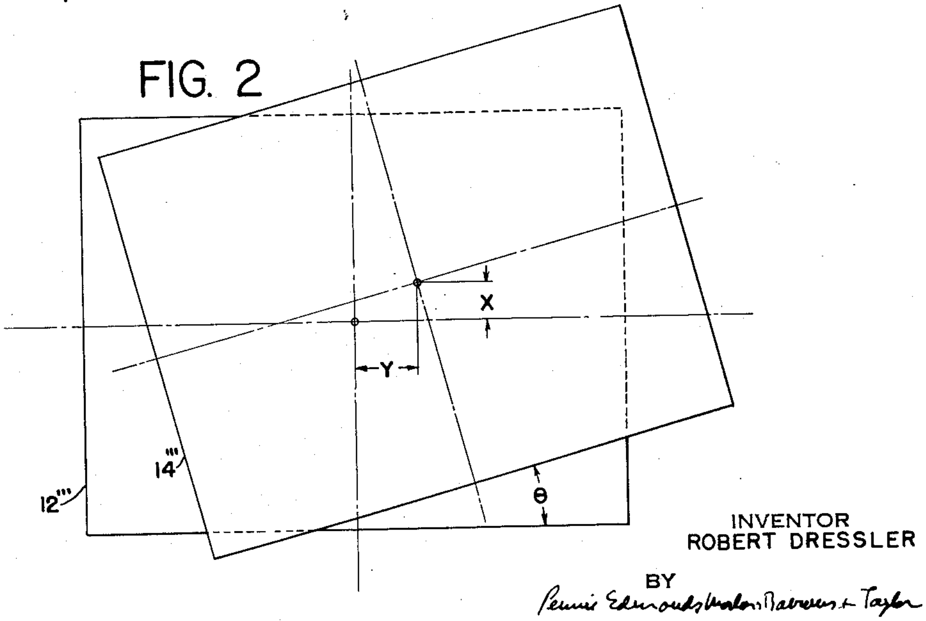
FIG. 2 is a diagram illustrating two successive photographic frames and the coordinates by which their relative positional relationship is indicated.

In FIG. 2 two film frames 12''' and 14''' are shown in partially overlapping relation. FIG. 2 indicates how the relative poistion of two such frames may be completely specified in terms of three coordinates $x$, $y$, and $\theta$. $x$ and $y$ are orthogonal linear coordinates referred to corresponding points in the two frames such as the centers 12 and 14 thereof as indicated in FIG. 2 and $\theta$ is an angular coordinate measuring the rotation of one frame with respect to the other, measured for example between two corresponding sides of the frames. The coordinates $x$, $y$ and $\theta$ may have negative as well as positive values. The coordinates $x$ and $y$ are selected to represent a pair of perpendicular geographical coordinates, such as easterly and northerly departures from a reference point (such as the center) fixed with respect to the first frame of a series the members of which are to be matched together in pairs. The directions of $x$ and $y$ with reference to the earth must be preserved unchanged throughout all matches which are to be used together. Their directions with respect to the sides of the first frame will depend on the aircraft heading at the time the first frame is made while their directions with respect to the sides of subsequent frames will depend upon the net accumulated rotation undergone by the aircraft in azimuth, plus the net rotation, if any, of the taking camera with respect to the radar or of the radar (and in particular of the deflection yoke of its P.P.I. tube) with respect to the aircraft.

Figures 3, 4:
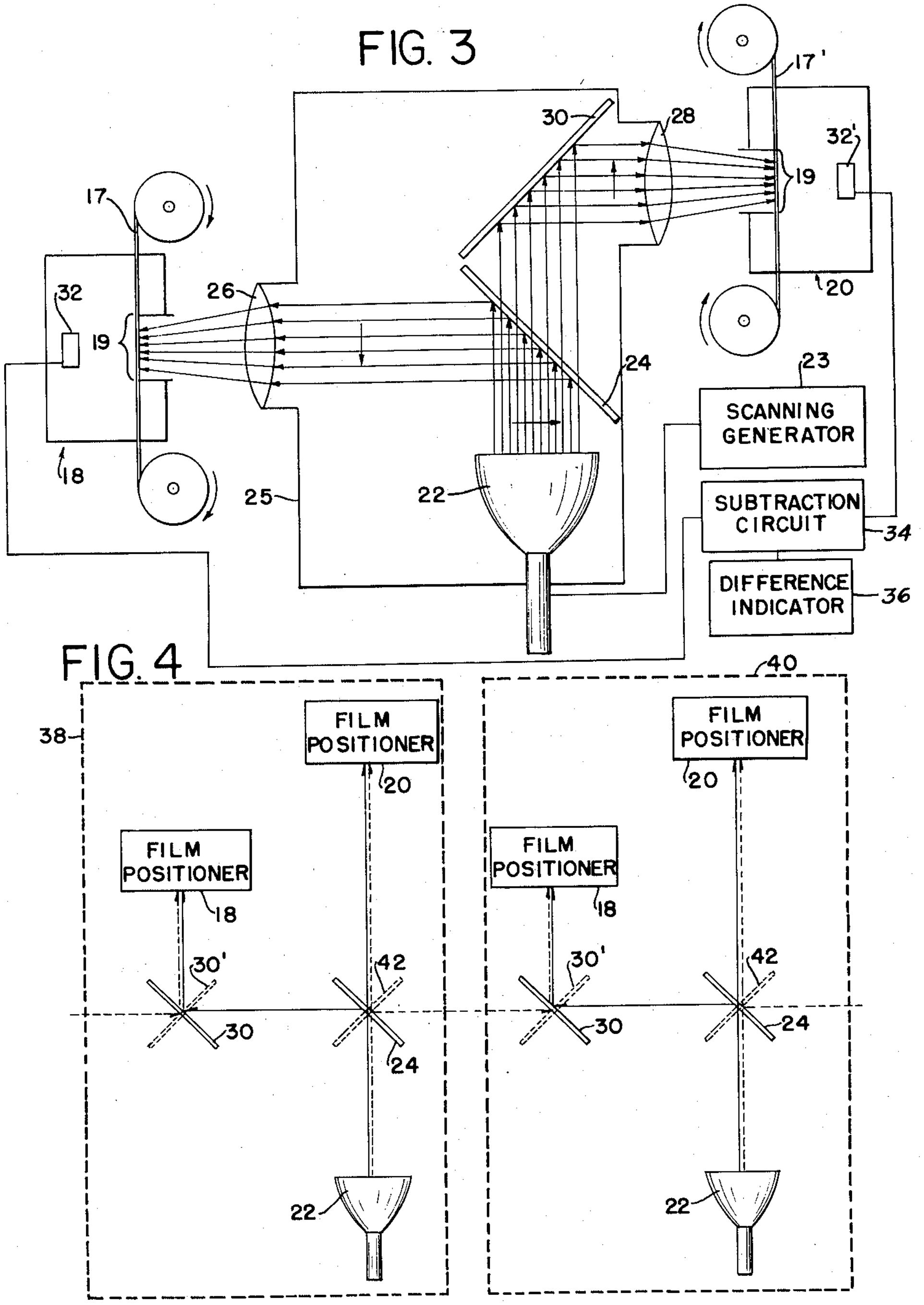
FIG. 3 is a schematic diagram of a radar photograph matching machine according to the invention.
FIG. 4 is a schematic diagram illustrating the combination of a plurality of machines of the type indicated in FIG. 3 by means of which the coordinates of radar landmarks or targets in an area may be plotted in terms of a plurality of strips of overlapping exposures.

FIG. 3 illustrates schematically a machine according to the invention by means of which the $x$, $y$, and $\theta$ coordinates for each pair of successive overlapping frames may be determined. Manually, of course, such a determination might be made by superimposing two such adjacent frames in the form of transparencies and adjusting them to effect a match in the common portion of their subject matter, $x$, $y$, and $\theta$ then being measured by the relative linear positions of the two frames with respect to each other and by their relative inclination. The invention provides instead a machine by means of which this matching operation may be performed in an organized and efficient manner with a very high degree of accuracy and rapidity particularly useful when a large number of exposures are available, such as would result from a mapping flight some hundreds of miles in length.

The machine schematically indicated in FIG. 3 provides means whereby the two film frames to be matched are supported in positioning mechanism permitting accurately controlled motions of the two frames with respect to each other and acurate reading of their relative poistion in terms of the $x$, $y$, and $\theta$ coordinates of FIG. 2, and means whereby the photographic density of the images on the two frames is compared. The two frames are then adjusted in relative position to match as closely as possible these densities, the exploration of photographic density being restricted to overlapping areas in the two exposures.

In the machine of FIG. 3 two film or frame holders are generally indicated at 18 and 20 through which strip films 17 and 17' are adapted to be passed from supply to take-up spools as indicated. The strip films in the two holders are identical. Thus each film may include in sucession the ten frames illustrated in FIG. 1, although in practice a larger number of frames will often be made on a single roll of film. Each holder includes a gate or exploration aperture 19, and mechanism whereby the film may be advanced frame by frame, each frame being positioned in exactly the same position, by reference to its edges, with respect to the holder. In practice this is achieved by the use in the taking camera of mechanism which accurately positions the unexposed film laterally and which advances it by a constant amount between exposures. The developed and printed transparency films 17 and 17' are then positioned in the two holders so that in one the frame presented at the gate is the frame adjacent the frame presented at the gate in the other holder.

For the exploration of their photographic density the films are scanned with a light spot derived from a flying spot scanning system the final component of which comprises a cathode-ray tube 22 whose fluorescent screen, selected to be of short persistence, is presented within a housing 25. A scanning generator and power supply for the scanning system is indicated at 23. A beam splitting mirror 24 is obliquely positioned in front of the fluorescent screen of tube 22 in position to send a portion of the light from the tube in the direction of holder 18 while the remainder is sent toward holder 20. Matched objective lenses 26 and 28 are arranged to image the screen of tube 22 accurately in the planes of the film gates 19 through which the separate films 17 and 17' of the holders 18 and 20 are respectively passed. A front surface mirror 30 deviates the beam passing through the half-silvered mirror 24 in order to send light from tube 22 through lens 28. The optical arrangement is such as to provide equal object distances and equal image distances for the two lenses 26 and 28, so that they produce identical images of the face of tube 22 in the planes of the film gates 19 of their associated holders 18 and 20 which are occupied by the emulsions of the films.

In view of the opposite inversions produced by mirrors 24 and 30, one of the film frames to be matched must be upright while the other is upside down. Both films are positioned with their emulsion sides facing the source of light in tube 22.

Film holder 20 is supported in mechanism, not shown in FIG. 3 but borne on a common base with housing 25 and holder 18, which permits accurately controlled and measurable translations of the film therein in two perpendicular directions within the plane of the frame exposed at gate 19, and also an accurately controlled and measurable rotation of the film in that same plane. Dial indicators or scales coupled to the movable mechanical elements permit reading the $x$, $y$ and $\theta$ coordinates with respect to each other of the frames in holders 18 and 20 when their positions have been matched. Film holder 18 is likewise supported from a common base by mechanism, not shown, which provides for measured angular motion of the film of that holder within the plane of the frame thereof exposed at the gate 19 of that holder. This mechanism may also permit translation of holder 18 in the plane of the frame exposed therein. The rotational motion of holder 18 permits insertion therein, after each match, of the increment in $\theta$ required for that match to be inserted into holder 20, in order that the $x$ and $y$ directions may be preserved.

Referring to FIG. 1 it will be seen that between frames 4 and 5 the aircraft has undergone a turn of 45°, and a further turn of 45° between frames 5 and 6. The match between frames 4 and 5 accordingly includes as a datum the value $\theta=45°$. In making the 5—6 frame match however it is evident that if the linear motions imposed on frame 6 in holder 20 are to measure the relative displacement of the frame centers in easterly and northerly directions, the total net preceding change in $\theta$ (which for the example of FIG. 2 is 45° arising from the 4—5 match) must be inserted into holder 18 before the 5—6 match is made. Hence after each match the value of $\theta$ for that match, appearing on the angular motion mechanism of holder 20 which contains the one of the frames being matched more remote from the starting point must be entered into the angular motion mechanism of the holder 18. For the 5—6 match the value of $\theta$ is 90°.

Each of the holders 18 and 20 includes a photoelectric device such as a photomultiplier tube, indicated in the two holders at 32 and 32', disposed effectively in fixed position with respect to the film gate 19 where it may be illuminated by light from the scanner 22 transmitted through the film frame in that holder. The output signals of tubes 32 and 32′ are then combined in an electronic subtraction circuit or differential amplifier 34 which subtracts one from the other and amplifies and detects the difference. The resulting signal is presented on an indicator 36 which may take the form of a microammeter.

The process of matching two frames consists in adjusting the position of the two film holders with respect to each other to achieve a minimum value for the difference signal displayed on indicator 36, and recording the *x, y, θ* values for the match, which are read from dials or the like linked to the positioning mechanism for holder 20 (assumed to contain the frame of the two being matched which is farther from the starting point). The *x* and *y* values recorded represent the departures linearly of holder 20 from the position in which the centers of the two frames would be scanned simultaneously. The *θ* value represents not the incremental but the accumulated net rotation imposed upon holder 20 up to and including the match whose data are being recorded, beginning with the first match.

Advantageously a scanning rate is used which is high compared to the response time of the difference signal indicator so that the difference signal observed effectively represents the quality of match over the entire area on the film frames illuminated. This area may be limited to the overlapping portion of the two frames to be matched by means of a mask suitably located, for example in a common portion of the optical path between the fluorescent screen in tube 22 and the beam splitting mirror 24. The lubber lines darkened center of the P.P.I tube and similar elements of non-radar information may also be desirably masked out.

Before proceeding to a description of the remaining figures attention may be called to the possibility, illustrated in frames 9 and 10 of FIG. 1, of shifts of the photographic image within the frame, with respect to the latter of which the *x, y* and *θ* data are taken. The centers of frames 9 and 10 are identified in FIG. 1 at $C_9$ and $C_{10}$, and evidently depart widely from the centers 9 and 10 of the images printed thereon. Neither are the lubber lines 9″ and 10″ parallel to the short sides of those frames, as is true of the first eight frames. The data for the 8—9 and 9—10 matches are consequently a combination of the aricraft motion between frame exposures with the image shift on the frame occurring in the same times. The composite chart to be produced will nonetheless be correct provided only that, in printing, for example with a photographic enlarger, the successive frames traversed across the printing paper in accordance with the *x, y* and *θ* data are on a film identical with that used for matching to obtain this data. If an actual chart is not to be produced, the amount of any such shift, both linear and angular, can be measured from the frame and used to correct the data. Or the frame may be positioned according to the data on a predetermined set of coordinates and then any geographical position of radar target, or that of the plane, may be read from these coordinates.

The mechanical arrangement of the film holders of the positioning mechanism therefor and of the flying spot scanning equipment can of course be widely varied within the scope of the invention. FIG. 4 indicates in diagrammatic fashion how a plurality of matches may be effected, substantially simultaneously if desired, between photographs over lapping both lengthwise of a flight path and transversely between adjacent flight paths. Thus in FIG. 4 a first operating position or frame matching unit indicated at a dash-line box 38 includes components of the type which have been described in FIG. 3 and a second operating position indicated at the dash-line box 40 constitutes a duplicate of the operating position 38. Each of operating positions 38 and 40 thus includes the flying spot scanner schematically indicated at 22, a beam splitting mirror 24 and film positioning units 18 and 20. Operating position 38 thus might be used to develop the *x, y* and *θ* data for a succession of overlapping exposures printed on a roll of film representing the successive exposures taken in the course of a single flight while position 40 is similarly employed to establish data concerning the overlapping exposures derived from an adjacent mapping flight, whose exposures overlap partially with those of the first flight. Thus there are put into the film holding positioners 18 and 20 of unit 38 a pair of identical film rolls bearing the successive exposures of one flight and there are put into the positioners 18 and 20 of unit 40 a pair of likewise identical film rolls representing the adjacent flight.

In order to match transversely of the flight paths, i.e. in order to determine the position coordinates of exposures of the second flight with respect to the immediately adjacent exposures of the first flight, the beam splitter 24 in unit 38 is removed and replaced by an oppositely inclined beam splitter 42 which optically couples together the film positioner 20 of unit 38 and film positioner 18 of unit 40. In this operation the substitution of mirror 42 for mirror 24 at position 38 is accompanied by substitution of a reflecting mirror 30′ in place of the reflecting mirror 30 at positioner 18 in unit 40.

Any desired number of frame matching units like the units 38 and 40 can be provided side by side and arranged with supplementary mirrors 42 and 30′, coupled to a ganged control if desired, for simultaneous substitution in all units for mirrors 24 and 30. The left-most matching unit of course will then not need any mirror 30′, nor will the unit on the right-hand end need any mirror 42.

FIG. 5 is an elevational view of a matching system according to the invention of the type diagrammatically indicated in FIG. 3. It comprises film positioners generally indicated at 18 and 20 on opposite sides of the housing 25 which contains the scanning tube 22, mirrors 24 and 30 and objective lenses 26 and 28 of FIG. 3. A meter 36 is shown in FIG. 5 for indication of the difference signal which is to be minimized in the matching operation. A monitor cathode-ray tube 54 presents visually the instantaneous difference signal over the same raster as that used to scan the frames to be matched, providing a visual indication of the quality of the match obtained. The display on the monitor tube 54 is helpful in effecting an initial coarse approximate match between the two frames.

The two film positioners and the housing 25 with its contents are supported on a common base plate 48. The two film positioners 18 and 20 of FIG. 5 are essentially the same in construction. They differ simply in a right-for-left reversal of certain of their controls in view of their location on the left and right sides of the cabinet 25. As has been stated, it is sufficient for one of the positioners to be provided with angular motion only. However it is advantageous to provide both positioners with translational motion as well, particularly in an arrangement such as that of FIG. 4 in which any given positioner may for certain matches contain the reference frame (i.e. the frame nearer the starting point of a series) and may for other matches contain the frame whose coordinates are sought with reference to an adjacent frame. It will be observed that in FIG. 5 the positioner 20 is mounted on a pedestal 50 which rests on base plate 48, conformably with the optical path requirements indicated in FIG. 3.

Figure 6:
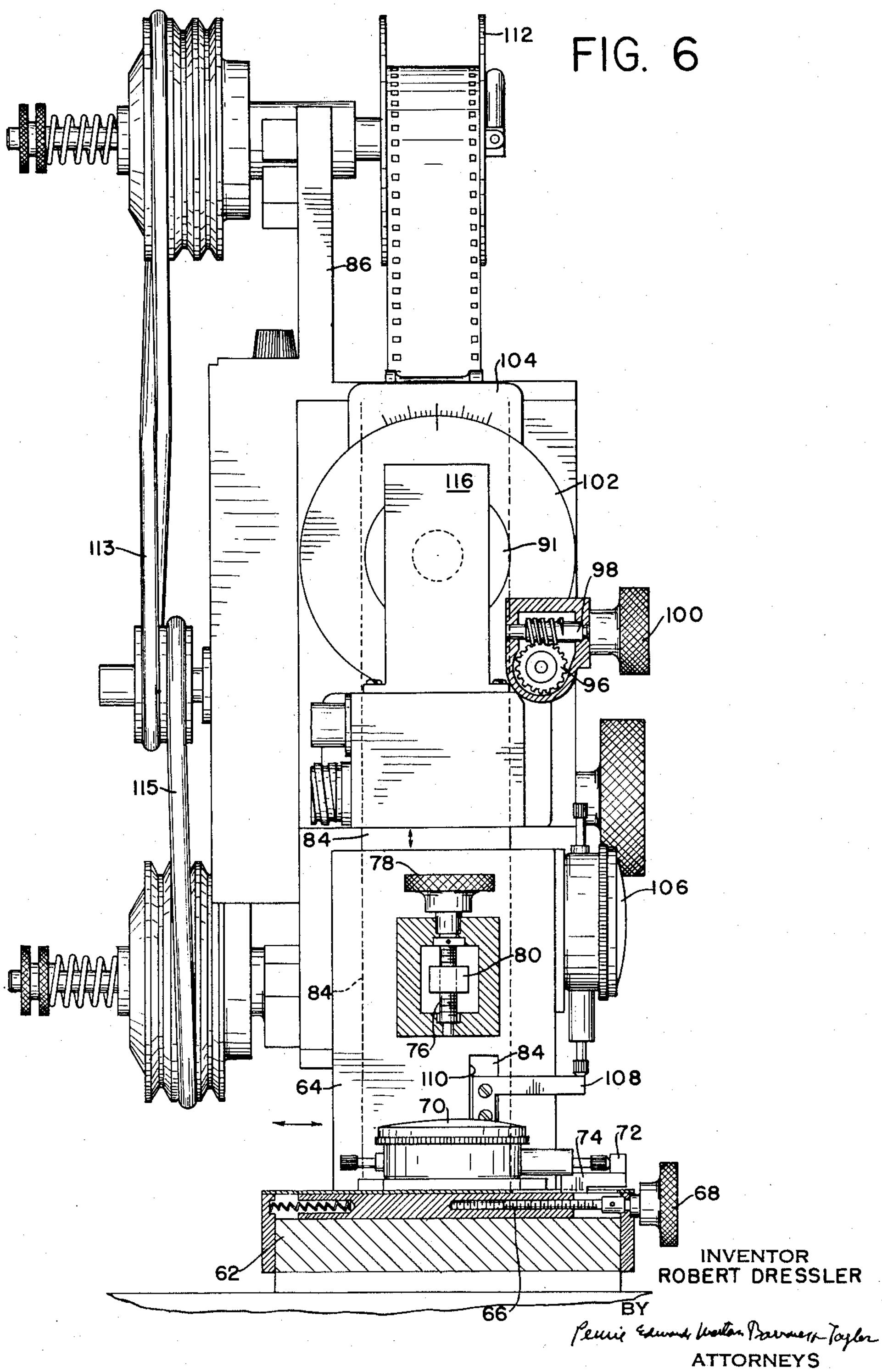
FIGS. 6 and 7 are front and side elevation views, respectively, of one of the two film positioning units in the machine of FIG. 5.

The film positioners will now be described in further detail with reference to FIGS. 6 and 7, which represent the positioner 18 of FIG. 5. The positioner includes a base plate 60, adjustably fixable as by means of bolts passing through slotted holes into the common base 48 of the apparatus of FIG. 5. Plate 60 supports a housing 62. Within the housing there are provided horizontal ways upon which rests a horizontally movable carriage 63 supporting a vertical housing 64. A screw 66 seen in FIG. 6 is journaled in the housing 62 for rotation under control of a hand wheel 68. The screw, which is restrained against axial motion, engages the carriage 63. Rotation of screw 66 accordingly translates the carriage 63 and housing 64 in a horizontal direction. The positioner is affixed to base 48 to make this direction parallel to the vertical plane of the image of the fluorescent screen of tube 22 produced by lens 28 (FIG. 3). Consequently this horizontal motion represents variation in one of the $x$ and $y$ position coordinates relating the two frames to be matched. A gauge 70 fastened to the fixed housing 62 engages with its movable element an anvil 72 affixed by an arm 74 to the vertical housing 64. By means of the gauge 70 the horizontal position of housing 64 and hence one linear coordinate can be read to an accuracy which may for example be of the order of one ten-thousandth inch.

The vertical housing 64 has journaled therein a screw 76 indicated in FIG. 6. This screw, supported against axial motion with respect to housing 64, is rotatable by means of a knurled hand wheel 78. The screw engages a nut 80 which is affixed to a vertical movable carriage generally indicated at 82. This carriage includes guide members 84 (FIG. 7) which engage vertically disposed ways within the housing 64. The nut 80 is fastened to the guide members 84. Rotation of the wheel 78 accordingly shifts the vertical carriage 82 upward and downward in a direction accurately perpendicular to the plane of base plate 48.

Rotation of wheel 78 hence varies the second linear coordinate of relative frame position. Vertical motion of carriage 82 is indicated at a gauge 106 affixed to the vertical housing 64, its movable element engaging an anvil 108 which is affixed to the guide member 84 of the vertically movable carriage 82, housing 64 being apertured at 110 to permit motion of anvil 108.

Figure 7:
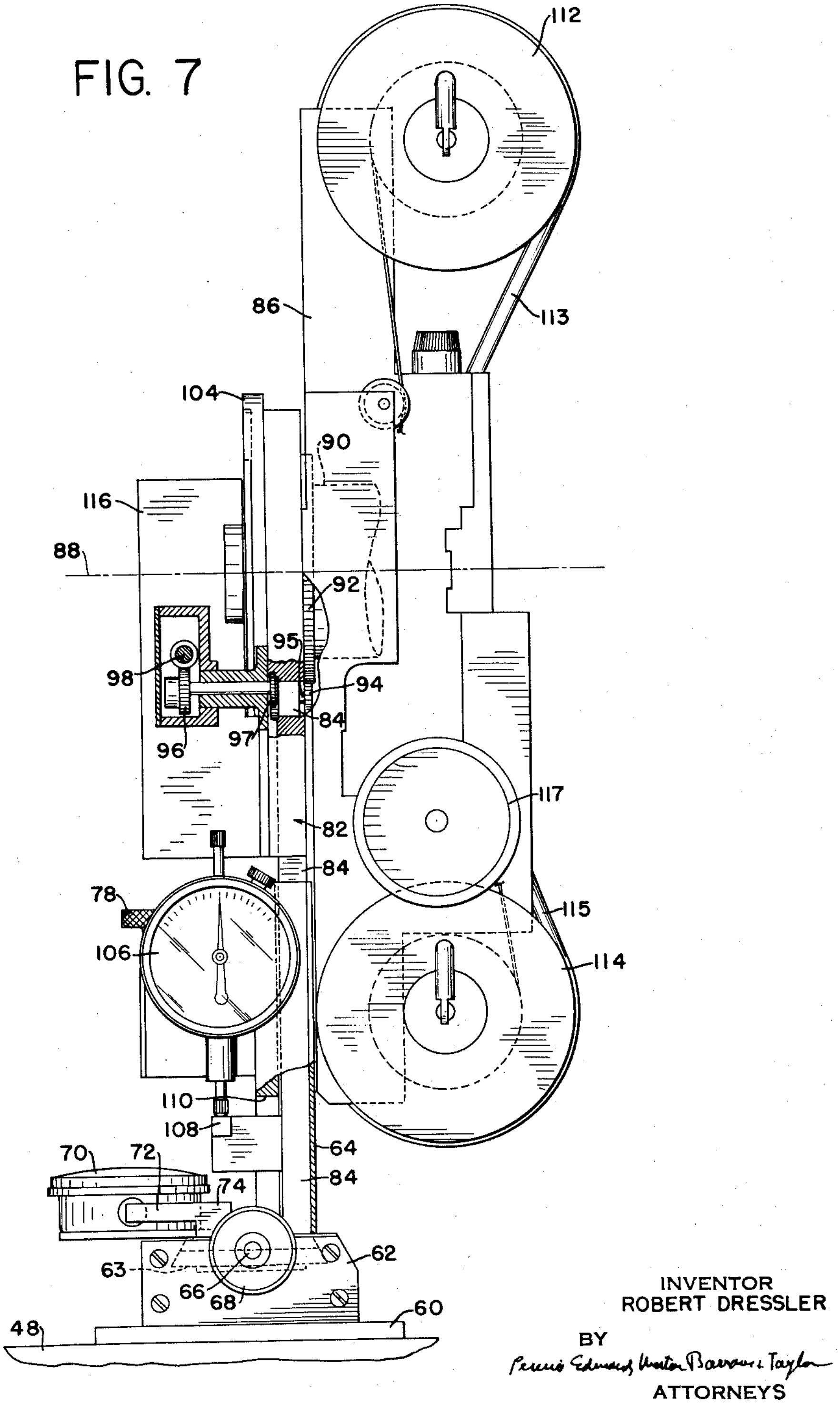

A film frame gate and transport mechanism generally indicated at 86, including in the embodiment illustrated film spools 112 and 114, is mounted for rotation with respect to carriage 82 about an accurately horizontal axis indicated at 88 in FIG. 7. To this end the housing 82 includes a horizontal bearing, not shown, which supports a hollow shaft 90 (FIG. 7) to which the film gate and transport mechanism 86 is fastened with the plane of the film gate perpendicular to axis 88 and with the area of the film gate centered thereon. A ring gear 92 concentric with and pinned to the shaft 90 is engaged by a pinion 94 which is fastened to a shaft 95 journaled in the vertical carriage 82. Shaft 95 is rotated through a train including a pair of spur gears 97 by means of a worm gear 96 engaged by a worm 98. Worm 98 is rotated by means of a hand wheel 100 indicated in FIG. 6.

A graduated dial 102 affixed concentrically to hollow shaft 90 on the side of the carriage 82 opposite the film gate and transport mechanism 86 permits the angular position of the latter to be read against a vernier scale 104 affixed to housing 82.

It will be understood therefore that hand wheel 68 governs one linear motion, hand wheel 78 governs the other linear motion and hand wheel 100 governs $\theta$ motion.

Supply and take-up spools for the film are shown at 112 and 114, respectively, the film being advanced from one to the other of these in either an upward or downward direction. As already indicated, with the beam splitting arrangement illustrated in FIG. 3, the film is passed through one positioner upwardly upon shift from frame to frame and is moved downwardly through the other positioner upon shift from frame to frame. The film gate and transport mechanism 86 includes between the spools 112 and 114 film gate apparatus defining an accurately positioned frame aperture. This aperture lies in a plane accurately perpendicular to the horizontal axis 88 and is advantageously made concentric therewith. The film spools are coupled by means of belts 113 and 115 to a film frame control 117.

On the carriage 82 on the side thereof opposite the film gate and transport mechanism 86 a housing 116 is provided which contains a photoelectric cell advantageously of the photomultiplier type with its cathode disposed substantially on the axis 88. A condenser lens 91 (FIG. 6) is positioned within the hollow shaft 90 so as to concentrate upon the cathode all light transmitted through the shaft from the aperture framed in the film gate. While the photomultiplier tube in housing 116 is not fixed with respect to the film gate in mechanism 86, the effect is the same as if it were since all light passing through the gate falls on the active element of that tube irrespective of the position of the mechanism 86.

Housing 116 also advantageously contains a cathode follower amplifier stage in order that the photomultiplier output signal may be transferred to an adjacent electronic tube chassis where the subtraction of the two photomultiplier signals from positioners 18 and 20 is effected.

FIGS. 8, 8$a$ are a schematic diagram of the electrical components of the apparatus of FIG. 5. In FIG. 8$a$ the photomultiplier tube and cathode follower combinations of the two positioners 18 and 20 of FIG. 5 are indicated in block diagram form at 152 and 154. These are coupled by cables 156 and 158 suitable for transmission of video frequencies to input terminals 160 and 162 of the differential amplifier. This amplifier comprises a double triode vacuum tube 164 whose cathodes are connected to ground through a common impedance. The plate of one triode half of tube 164 is held at A.C. ground by capacitors while the plate of the other half is provided with a plate load resistance across which appears a video frequency voltage representative of the difference in photographic density of area elements in the two frames being instantaneously scanned. It is seen that on the plate of the right-hand half of tube 164 the signal from photocell unit 154 in positioner 20 has undergone a 180° phase shift while that from photocell unit 152 in positioner 18 has not.

In view of the greater amplification provided by the plate-loaded right-hand half of the tube 164, the input signal thereto from photocell unit 154 includes a potentiometer 165 by means of which the two halves of tube 164 may be balanced to produce zero difference output when the input terminals 160 and 162 are short-circuited together in the B or "balance" position of ganged switch 167.

The subtracting tube 164 is followed by a three stage video amplifier including tubes 166, 168 and 170. A ganged switch 169 is provided which in one position attenuates the low frequency transmission of this amplifier, to permit the operator to concentrate on the difference signal due to fine detail in the two frames being matched by manipulation of positioners 18 and 20 (FIG. 5). In its other position switch 169 constitutes tubes 166, 168 and 170 into a wide band video amplifier.

The output of tube 170 is applied to an intensity controlling electrode of the monitor cathode-ray tube 54 and additionally, through a cathode follower stage 172 (FIG. 8) to a detecting and indicating circuit including meter 36 (FIG. 8).

In order to permit presentation on tube 54 (FIG. 8$a$) of the oppositely signed variations in photographic density derived in the subtracting stage 164, and also to permit proper operation of the diode detectors 174 and 176 (FIG. 8) associated with the circuit of meter 36, it is necessary that the control grids of tubes 54 (FIG. 8$a$) and 172 (FIG. 8) be restored periodically to a specified level. This is done at the end of every line scan by means of a clamping circuit including diodes 178 and 180. D.C. reinsertion cannot be employed in the absence of a specified black level on the line synchronizing pulses.

The scanning generator is indicated in block diagram form at 23, and the flying spot scanning cathode-ray tube 22 is shown beneath it, coupled to generator 23 by means of line and field deflection coils 184 and 186. Line and field deflecting coils associated with monitor tube 54, though omitted from FIG. 8*a* for simplicity, are also driven by generator 23 (FIG. 8) so that tubes 22 (FIG. 8) and 54 (FIG. 8*a*) are scanned in synchronism. Generator 23 also develops line and field retrace blanking signals which are applied to tubes 22 and 54. For tube 54, a blanking input amplifier tube 188 (FIG. 8*a*) is provided for this purpose, receiving blanking signals at an input jack 190. Marker signals, as for example a set of signals making up a cross ruled grid, may be applied from a suitable source to tube 188 at a second input jack 192.

Operation of the clamping circuit including tubes 178 (FIG. 8) and 180 is controlled by means of a blocking oscillator generally indicated at 194, which is coupled to scanning generator 23 to be triggered into cyclical operation at line scan frequency. A diode-connected tube 195 is arranged to damp out any oscillations of oscillator 194 other than a single line frequency pulse. The plate-to-grid feedback transformer 196 of this blocking oscillator includes two supplementary windings 198 and 200 which are arranged in a bridge circuit with capacitors 181 and with the back-to-back connected tubes 178 and 180.

Windings 198 and 200 are poled to aid in sending a pulse of current through the clamp tubes at line frequency, each time the blocking oscillator tube conducts, i.e. at the end of each line scan, tubes 178 and 180 being nonconducting during the scanning of each line. Resistors 202 and 204 are connected in series between the plate of tube 178 and the cathode of tube 180, and an adjustable tap 206 on resistor 200 leads to a low impedance source of fixed low positive potential provided at the cathode of a triode tube 208. By adjustment of tap 206 and (for fine control) by adjustment of the variable resistor 204, the charging of capacitors 181 and of the coupling capacitor 210 between tubes 170 (FIG. 8*a*) and 54 is governed in a manner which sets the voltage to which the grid of tube 54 is returned at the beginning of each line blanking pulse.

Of equal or greater importance is the function of the clamping circuit in setting, at the end of each line scan, the potential at the grid and hence at the cathode of the cathode follower 172 (FIG. 8). This cathode is set by the clamping action at the same voltage level as the terminals of rectifier diodes 174 and 176 remote therefrom, in order that conduction through the diodes may represent only the video signal coming from tube 170 (FIG. 8*a*), variations of one sign passing through one rectifier diode and those of the opposite sign through the other.

The positive and negative rectified portions of the video signal developed in rectifiers 174 (FIG. 8) and 176 are applied through integrating resistance-capacitance networks to the grids of the double triode tube 210, across whose plates is connected meter 36, either directly or, for reduced sensitivity, through one of a plurality of resistors of graduated value selected at a switch 212.

The plate supply for the two halves of tube 210 includes a potentiometer 213 with B+ applied to the tap thereof, for zero adjustment of the meter, i.e. to produce a zero or specified meter reading when the input levels to the two halves of tube 210 are equal. Such a condition may be obtained by closing a switch 214 which short circuits the grids of tube 210 together. A fine control for adjustment of the meter circuit is provided by means of a variable resistor 216 in the plate lead of one half of tube 210.

In preparing the apparatus of FIG. 5 for use the meter adjustment just described is first made. Switch 214 is then opened, and switch 167 (FIG. 8*a*) is set to the position A therefor, in which plate voltage is removed from tube 168. Under these conditions, and with the scanning generator in operation, no video signal is applied to diodes 174 (FIG. 8) and 176, and the clamp level controls 206 and 204 are adjusted for minimum meter reading to achieve zero D.C. voltage across rectifiers 174 and 176.

Switch 167 (FIG. 8*a*) is then shifted to its B position, in which the video amplifier channel is energized but in which the input terminals 160 and 162 to the subtraction stage 164 are short circuited together. Balance potentiometer 165 is then adjusted for minimum meter indication. Switch 167 may then be shifted to its C or operating position. It is then desirable to equalize the separate signal channels between the beam splitting mirror 24 of FIG. 3 and the subtraction tube 164 of FIG. 8*a* by inserting identical (not adjacent) pictures in the two positioners, matching their positions, and adjusting one or both signal channels, for example by control of the voltages applied to the photomultiplier tubes of units 152 and 154, to obtain minimum meter indication.

Of course errors accumulate in extrapolating, according to the matching procedure which has been described, from an initial frame for which the geographical coordinates, including direction or heading, are known. Check points, i.e. landmarks of known coordinates appearing in later frames, may then be used for correction of the $x$, $y$, and $\theta$ data for the position of intermediate frames. In addition correction, or rather modification, may be applied to the data as required by the particular projection, e.g. Lambert or other, which is to be employed.

Of the apparatus of FIGS. 8, 8*a* the meter 36 and the monitor cathode-ray tube 54 are visible in FIG. 5. The flying spot scanning tube 22 is contained in housing 25 and the photomultiplier-cathode follower units 152, 154 are contained in the housings 116 of positioners 18 and 20. The other components of FIGS. 8*a*, 8 may be located as convenient, for example, in racks adjacent to the apparatus actually shown in FIG. 5.

The circuit of FIG. 8, 8*a* indicates the quality in the match of the positions of the two frames being compared by means of a direct subtractive determination of the difference between the two photomultiplier signals generated in the units 152 and 154 of FIG. 8*a*. Other methods may however be employed for determining this difference and for indicating the quality of the position match. FIG. 9 is a block diagram of an alternative form of apparatus for determining from the photomultiplier signals in units 152 and 154 the difference between those signals and hence the quality of the match. This determination is made by a statistically different method, namely that of the cross correlation function of the signals.

If $f(t)$ and $g(t-\lambda)$ represent two signals, one delayed with respect to the other by a variable time $\lambda$, the cross correlation function $\Phi(\lambda)$ for the two is given by:

$$\Phi(\lambda)=\frac{1}{P}\int_0^P f(t)g(t-\lambda)dt$$

If the functions $f(t)$ and $g(t-\lambda)$ have marked similarities, the cross correlation function reaches a peak when the similarities are in time coincidence. The apparatus of FIG. 9 generates the cross correlation function for the photomultiplier signals of units 152 and 154, one of these being the function $f(t)$ and the other being the function of $g(t-\lambda)$ where $\lambda$ represents the time delay (due to imperfection in the position match) between the scanning of corresponding subject matter points in the two frames located in the positioners 18 and 20 of FIG. 5.

To obtain the cross correlation function of the photomultiplier signals from the two positioners, hereinafter referred to as $f(t)$ and $g(t-\lambda)$, the apparatus of FIG. 9 derives the product thereof and then develops the average of this product. Photocell units 152 and 154 are connected respectively to the inputs of a pair of amplifiers 302 and 304. These are employed as the vertical ($y$) and horizontal ($x$) deflection amplifiers for a cathode-ray tube 300, although obviously the connections of these amplifiers may be interchanged in this respect. Amplifiers 302 and 304 incorporate clamping diodes at their outputs by means of which a spot position at, for example, the lower left corner of a rectangular raster area on the fluorescent screen of tube 300 is made representative of zero values for both of the signals $f(t)$ and $g(t-\lambda)$ generated in photocell units 152 and 154. Vertical motion of the spot from this zero position is then representative exclusive of values of, say, the $f(t)$ function, whereas horizontal motion is representative exclusively of values of the $g(t-\lambda)$ function.

To complete the derivation of a signal representative of the product $f(t)g(t-\lambda)$, the light from the luminous spot on tube 300 is passed successively through two crossed optical wedges 306 and 308 diagrammatically indicated in FIG. 9. Each of these wedges has a light transmission characteristic which is constant along one direction of spot deflection in tube 300 and which is a linear function of spot deflection in the perpendicular direction. Thus wedge 306 has a light transmission varying linearly with the $y$-value of the spot position but independent of its $x$-value and vice versa for wedge 308. With such crossed wedges 306 and 308 the light from tube 300 which is transmitted through the two wedges is proportional to a sum including a term proportional to the product of the two initial signals and including other terms proportional to the transmission of the wedges at the $x=0$ and $y=0$ positions therefor. These latter terms can be made very small by making the transmission of wedge 306 small at $y=0$ and by making the transmission of wedge 308 small at $x=0$.

The light output from the two wedges is then applied, by means of light collector 310 which may take the form of a condensing lens for example, to a photosensitive device such as a photomultiplier tube 312 whose output signal therefore represents the desired product. This signal is applied to an integrating circuit 314 having a time constant preferably several times as long as the frame scanning period in the machine of FIG. 5.

The integrated signal produced by the integrating circuit 314 contains a term proportional to the cross correlation function of the light transmissions in the two frames being compared, together with a series of terms which (for a suitably long period of integration as above indicated) are independent of the delay $\lambda$ between the two signals in the cross correlation function and which terms are additive. Since these constant terms are additive, the shape of the cross correlation function over and above these constant terms is unchanged and the system can be used for correlation.

The output of integrating circuit 314 is applied to an amplifier 316 and then to an indicator 320, a periodically operating clamping circuit 318 being inserted in case amplifier 316 is an A.C. amplifier as is convenient. Indeed because of the slowly varying nature of the photomultiplier output signal, it is convenient to apply that signal as a modulation to a locally generated carrier, for example that produced by a chopper operated at power line frequency. The chopper, by periodically returning the amplifier grid to fixed potential, may be employed to effect the clamping function.

In the embodiment of FIG. 9 therefore maximum signal on indicator 320 represents an optimum quality of match, whereas in that of FIGS. 8, 8*a* minimum signal on the indicator 36 indicates optimum quality of match. A machine according to the invention embodying the apparatus of FIG. 9 of course also requires the flying spot scanner and related components of FIGS. 8, 8*a*.

While the invention has been described herein with reference to a preferred mode of operation and a number of preferred forms of apparatus, the invention as such is not limited to the details of either. For example, north stabilization may be incorporated into the radar, thus reducing the rotations required in the film positioners. In the equipment employed for matching, it is of course not necessary to translate and rotate a complete reel of film; the film positioners may be constructed to translate and rotate only the frames being matched. This will be particularly advantageous when large film is employed, which will permit a relaxation of the mechanical tolerances on the x, y and $\theta$ motion controlling elements. The optical system may be constructed to employ a single lens system in the common portion of the path between the flying spot scanner and the beam splitter.

I claim:

1. Apparatus for matching pairs of images having partly overlapping content, said apparatus comprising means to develop a flying spot, means to project images of the raster in two raster areas, two image holders disposed one adjacent each of said areas, photoelectric means to compare the light transmission through said areas, means to rotate one of said holders about an axis perpendicular to and passing through one of said areas, and independent means to rotate the other of said holders about an axis perpendicular to and passing through the other of said areas and to shift said other holder in inclined directions parallel to the other of said areas.

2. Apparatus for determining the relative positional arrangement of transparency-type photographs of partly overlapping portions of the earth required to match said overlapping portions, said apparatus comprising means to develop a flying spot raster, means to produce an image of said raster in each of two fixed areas, two photograph holders disposed one adjacent each of said areas, each of said holders being adapted to hold one of said photographs in defined position relative to such holder, photoelectric means disposed adjacent each of said areas in position to respond to light passed therethrough, means to indicate the difference in excitation between said photoelectric means, means to shift one of said holders rotationally, and means to shift the other of said holders rotationally and translationally.

3. Apparatus for determining the relative positional arrangement of transparency-type photographs of partly overlapping portions of the earth required to match said overlapping portions, said apparatus comprising means to develop a flying spot raster, means to produce an image of said raster in a fixed position in each of two plane areas, two photograph positioners disposed each adjacent one of said areas, separate photoelectric signal generating means arranged each to respond to light passing through one of said areas, a differential amplifier having said signal generating means coupled to the input thereof, means to detect the output of said amplifier, and an indicator responsive to said detected output.

4. Apparatus for determining the relative positional arrangement of transparency-type photographs of partly overlapping portions of the earth required to match said overlapping portions, said apparatus comprising means to develop a flying spot raster, means to produce identical images of said raster in two plane areas, two photograph positioners disposed each adjacent one of said areas, separate photoelectric signal generating means arranged each to respond to light passing through one of said areas, a differential amplifier having said signal generating means coupled to the input thereof, a cathode-ray monitor display tube scanned according to said raster having an intensity controlling electrode coupled to the output of said amplifier, and means to clamp said electrode to a fixed voltage at the end of each line scan in said raster.

5. Apparatus for determining, with respect to pairs of cartographic photographs having partly overlapping coverage, the relative positional relation of said photographs corresponding to their overlapping coverage, said apparatus comprising means to explore simultaneously two fixed areas with a luminous spot according to a common raster, two photograph holders arranged each to support a photograph of such a pair in one of said areas, two light sensitive devices disposed each adjacent one of said areas, means to compare the output signals of said devices, and calibrated positioning mechanism having two linear motions and one angular motion coupled to one of said holders.

References Cited in the file of this patent

UNITED STATES PATENTS

| | | |
|---|---|---|
| 510,758 | Adams | Dec. 12, 1893 |
| 1,199,733 | Dietz | Sept. 26, 1916 |
| 1,331,978 | Brock et al. | Feb. 24, 1920 |
| 1,565,413 | Brock et al. | Dec. 15, 1925 |
| 1,693,527 | Reeves | Nov. 27, 1928 |
| 1,822,650 | Fairchild | Sept. 8, 1931 |
| 1,910,425 | Cahill | May 23, 1933 |
| 2,155,248 | Adams et al. | Apr. 18, 1939 |
| 2,251,828 | Hammond | Aug. 5, 1941 |
| 2,556,871 | Degnan et al. | June 12, 1951 |
| 2,600,261 | Pennington | June 10, 1952 |
| 2,665,481 | Henry | Jan. 12, 1954 |
| 2,667,634 | Hart | Jan. 26, 1954 |
| 2,672,786 | Capstaff | Mar. 23, 1954 |
| 2,679,636 | Hillyer | May 25, 1954 |
| 2,787,188 | Berger | Apr. 2, 1957 |

FOREIGN PATENTS

| | | |
|---|---|---|
| 87,748 | Norway | July 23, 1956 |
| 174,622 | Great Britain | June 25, 1923 |

UNITED STATES PATENT OFFICE

CERTIFICATE OF CORRECTION

Patent No. 2,989,890 June 27, 1961

Robert Dressler

It is hereby certified that error appears in the above numbered patent requiring correction and that the said Letters Patent should read as corrected below.

Column 11, line 12, for "exclusive" read -- exclusively --; column 12, line 16, after "spot" and before the comma insert -- raster --; line 17, strike out "raster", second occurrence.

Signed and sealed this 14th day of November 1961.

(SEAL)
Attest:

ERNEST W. SWIDER
Attesting Officer

DAVID L. LADD
Commissioner of Patents

USCOMM-DC